United States Patent [19]

Hattori et al.

[11] 4,302,489
[45] Nov. 24, 1981

[54] PROCESS FOR PRODUCING A FOAM SHEET HAVING AN EMBOSSED PATTERN

[75] Inventors: Kenro Hattori; Takeshi Ogawa; Minoru Ochiai; Takeshi Tomikawa; Takeji Ikeda, all of Ashikaga, Japan

[73] Assignee: Kohkoku Chemical Industry Co. Ltd., Tokyo, Japan

[21] Appl. No.: 205,072

[22] Filed: Nov. 10, 1980

[30] Foreign Application Priority Data

Nov. 19, 1979 [JP] Japan ................. 54/149781

[51] Int. Cl.$^3$ ............................................. B05D 5/00
[52] U.S. Cl. .................................. 427/244; 264/45.8; 264/52; 264/DIG. 82; 427/264; 427/273; 427/373
[58] Field of Search ............... 427/244, 373, 273, 264; 264/45.8, 52, DIG. 82

[56] References Cited

U.S. PATENT DOCUMENTS

| | | | |
|---|---|---|---|
| 3,293,094 | 12/1966 | Nairn et al. | 264/52 X |
| 3,365,353 | 1/1968 | Witman | 264/52 X |
| 3,844,814 | 10/1974 | Bettoli et al. | 427/373 X |
| 4,187,131 | 2/1980 | Shortway et al. | 427/244 X |

FOREIGN PATENT DOCUMENTS

1422141  1/1976  United Kingdom ................. 427/264

*Primary Examiner*—Evan K. Lawrence
*Attorney, Agent, or Firm*—Ladas & Parry

[57] ABSTRACT

According to the process for producing a foam sheet having an embossed pattern of the present invention, a coating containing an aliphatic ketone type solvent as its main ingredient and being incapable by itself of substantially inhibiting decomposition of a blowing agent comprising azodicarbonamide as its main ingredient is printed in the form of a pattern on selected portions of the surface of a foamable polyvinyl chloride resin sheet material containing a specific amine or amines and the blowing agent, and the foamable sheet material subsequently is heated to foam it. The quantity of gas given off due to decomposition of the blowing agent decreases to a large extent in the portions on which the coating has been printed by reason of interaction between the specific amine or amines and the aliphatic ketone type solvent and, consequently, the unprinted portions of the foamable sheet material are caused to foam to a greater extent than the printed portions, and the unprinted portions are raised in contrast to the printed portions, thereby presenting an appearance of an embossed pattern on the surface of the produced foam sheet.

8 Claims, No Drawings

PROCESS FOR PRODUCING A FOAM SHEET HAVING AN EMBOSSED PATTERN

BACKGROUND OF THE INVENTION

This invention relates to a process for producing a foam sheet having an embossed pattern and, more particularly, to a process for producing a foam sheet having an embossed pattern by applying a coating containing an aliphatic ketone type solvent as a main ingredient over a foamable polyvinyl chloride resin sheet material containing a specific amine or amines and a blowing agent comprising azodicarbonamide as a main ingredient and subsequently heating the foamable sheet.

Known in the art of producing foam sheets having embossed patterns are processes as disclosed in the specifications of Japanese Patent Publication No. 15713/1968, U.S. Pat. No. 3,293,108, U.S. Pat. No. 3,293,094 (Japanese Pat. No. 578566) and Japanese Patent Publications Nos. 4913/1971 and 13929/1971 according to which embossed patterns are formed on foam sheets by applying a coating added with a compound which either inhibits or accelerates decomposition of a blowing agent over the surface of foamable synthetic resin sheets containing the blowing agent which is decomposed by heating and subsequently heating the foamable sheets to cause a differentiation in the degree of foaming in portions to which the coating has been applied from that in portions to which the coating has not been applied.

In these prior art processes, it has been necessary, as indicated above, to add a compound (e.g. an acid anhydride or amine) which inhibits or accelerates decomposition of the blowing agent to the coating. It has been found, however, that the addition of such compound (inhibitor or accelerator) to a common type of coating causes difficulty in using the coating in some cases due to occurrence of blushing or gelling or, even if such troubles do not occur, viscosity of the coating increases to such a degree that they can no longer be suitably used for printing purposes. For these reasons, the prior art processes are disadvantageous in that types of coatings to which such compounds having a function of inhibiting or accelerating decomposition of the blowing agent can be added without adversely affecting properties of the coatings are extremely limited.

It is, therefore, an object of the present invention to provide a novel process for producing a foam sheet which has eliminated the above described disadvantages of the prior art methods and is capable of forming a foam sheet having a distinct embossed pattern by using a coating of a common or conventional composition without addition of any foaming accelerator or inhibitor and, accordingly, is free from the likelihood of occurrence of blushing, gelling or viscosity increase in the coatings.

Laborious studies may be the inventors of the present invention on the mechanism of foaming inhibition in the prior art processes have resulted in the finding, which has led to the present invention, that while specific amines to be described later do not function to reduce the quantity of a gas which is given off as a result of decomposition of a blowing agent containing azodicarbonamide as a main ingredient if these amines alone are used with such blowing agent, these amines function to reduce the quantity of such gas to a great extent if they are used together with aliphatic ketone type solvents among known solvents for coating which likewise have no function of reducing the quantity of the gas given off as a result of the decomposition of the blowing agent containing azodicarbonamide as its main ingredient if these solvents alone are used with the blowing agent. Consequently, according to the finding, application of a common coating which contains the aliphatic ketone type solvent as a main ingredient and no added compound functioning to inhibit or accelerate decomposition of the blowing agent comprising azodicarbonamide as its main ingredient to a foamable synthetic resin sheet containing the blowing agent can remarkably inhibit foaming of the foamable sheet in portions to which the coating has been applied, if the above described specific amine or amines have been added to the formable sheet, and a foam sheet having a desired embossed pattern can thereby be produced.

SUMMARY OF THE INVENTION

According to the process of the present invention, a coating containing an aliphatic ketone type solvent as its main ingredient and being incapable by itself of substantially inhibiting decomposition of a blowing agent comprising azodicarbonamide as its main ingredient is printed in the foam of a pattern or design on selected portions of the surface of a foamable polyvinyl chloride resin sheet containing a specific amine or amines and the blowing agent and subsequently the unprinted portions of the foamable sheet material are caused to foam to a greater extent than the printed portions upon heating whereby the unprinted portions are raised in contrast to the printed portions.

The specific amines which are added to the foamable sheet material according to the invention are isophoronediamine and dodecylamine. Either one of these amines or mixtures of these two amines are added to the foamable sheet. Amines other than these specific amines such, for example, as ethanol amine, ethylenediamine, hexamethylenediamine, octamethylenediamine, dihexylamine, tributylamine, trioctylamine, 3,3'-iminobispropylamine, triethylenetetramine, aniline, P-nitroaniline, P-phenylenediamine, xylenediamine, tolylenediamine, acetoanilide, hydrazobenzene, triaminophenol-triglycidyl ether, hexadecylpiridinium chloride, benzoyloxime, diphenyl carbazone, imidazole and 8-hydroxyquinoline have not produced any embossing effect notwithstanding that they have been employed with a foamable sheet under the same condition as the specific amines employed in the process according to the invention.

DETAILED DESCRIPTION OF THE INVENTION

While addition of a very small amount of the specific amines to the foamable sheet material is effective for the purposes of the invention, 0.1 or more weight parts of the amines should preferably be added to 100 weight parts of polyvinyl chloride resin for contrasting the raised portions distinctly against the unraised portions and presenting clear-out boundaries between the raised portions and the unraised portions. For the foamable sheet material, a commonly used polyvinyl chloride resin will suffice and no particular limitation is imposed. The foamable polyvinylchloride resin sheet may be produced by paste processing, calendering or extruding.

Commonly used plasticizers such as dioctyl phthalate, dibutyl phthalate and epoxy type plasticizers can be used for plasticizers to be added to the polyvinyl chloride resin. As for stabilizers, no particular limitation is imposed upon the type of the stabilizer. Presence of a metal compound of Zn, Pb or Cd, however, is necessary for decomposition and foaming of azodicarbonamide and stabilizers of Zn, Pb and Cd types are preferable in this respect.

The blowing agent which is suitable for use in the process according to the invention is azodicarbonamide. It has been found that other blowing agents such as dinitropentamethylenetetramine, benzene sulphonyl hydrazide, p-toluene sulphonyl hydrazide, p,p'-oxybis (benzene sulphonyl hydrazide), 3,3'-disulphonehydrazide-diphenylsulphone and azobisisobutyronitrile do not demonstrate the embossing effect if these blowing agents are used under the same conditions as azodicarbonamide. These blowing agents however may be mixed with azodicarbonamide so long as azodicarbonamide constituents the main ingredient of the blowing agent.

Commonly used coatings such as nitrocellulose lacquer, acetyl cellulose lacquor, vinyl chloride type coatings, vinylacetate type coatings, acrylic type coatings, epoxy type coatings and polyurethane type coatings can be used for the process according to the invention. The vinyl chloride type, acrylic type and polyurethane type-coatings are preferred in respect of bonding with the foamable polyvinyl chloride resin sheet. These coatings should contain an aliphatic ketone type solvent as a main ingredient of the solvent or diluent. In addition, these coatings are normally used with coloring stuff such as inorganic and organic pigments and dyestuff added thereto. It is, however, not excluded from the scope of the invention to print, in the form of a pattern, a coating containing the aliphatic ketone type solvent as the main ingredient and no coloring stuff at all over the surface of the foamable polyvinylchloride resin sheet containing the specific amine or amines and subsequently causing the sheet to foam by heating it. In this case, a foam sheet which has an embossed pattern but no printed pattern on the surface thereof can be produced.

The aliphatic ketone type solvents adaptable for use in the present invention include acetone, methyl ethyl ketone, methyl propyl ketone, methyl isobutyl ketone, methyl butyl ketone, mesityl oxyde, 2,4-pentadione, acetonyl aceton, diacetonealcohol etc. Among these solvents, acetone, methyl ethyl ketone and methyl isobutyl ketone are preferred in respects of the boiling point and solubility of coating binders. While one kind of aliphatic ketone may be used, mixture of two or more kinds of such aliphatic ketones may also be used as the aliphatic ketone type solvent for modifying the boiling point in a case where the process according to the invention is practiced in a factory scale. The aliphatic ketone type solvent may be used with other types of solvents such as alicyclic ketone type solvents including isophorone, cyclohexanone and methylcyclohexanone, ester type solvents including ethyl acetate, butyl acetate, Cellosolve acetate and methyl Cellosolve acetate, ether type solvents including ethyl ether, furan and tetrahydrofuran, alcohol type solvents including methanol, ethanol, butanol, octanol and ethylene glycol, hydrocarbon type solvents including toluene, xylene and benzene and chlorinated hydrocarbon type solvents including dichloroethane, dichloroethylene, trichloroethylene and perchloroethylene. These are only listed for illustrative purpose and solvents which can be used with the aliphatic ketone type solvents are not limited to them.

The ingredient ratio in weight percent of the aliphatic ketone type solvent in the coating is preferably 50% or more. If the ratio of the aliphatic ketone type solvent is small, a desired embossed pattern cannot be produced.

An embodiment of the process for producing a foam sheet having an embossed pattern according to the invention will now be described. In this embodiment, paste PVC resin is employed for the polyvinyl chloride resin sheet material. Polyvinyl chloride plastisol containing the specific amine or amines and the blowing agent is coated in a predetermined thickness over the upper surface of a base consisting of a suitable material such, for example, as woven, knitted and unwoven fabrics, paper, wooden, metal, glass and plastic sheets, a plastic film and an asbestos sheet by any suitable means such as a doctor blade and a reverse roll coater. The coated plastisol is heated for about 2 to 5 minutes at a temperature between 120° C. and 170° C. to gell the plastisol and then the coating containing the aliphatic ketone type solvent as its main ingredient is printed in the form of a pattern or design on selected portions of the surface of the gelled plastisol by means of a suitable printing or coating means such as gravure printing, intaglio printing, decalcomania by a reverse roll coater, printing employing various types of screens and spray coating. The foamable sheet material thus provided with the printed pattern is dried and thereafter is heated for a period of 1 to 15 minutes at a temperature between 180° C. and 220° C. for foaming of the foamable sheet material. The foaming does not take place in the portions on the surface of which the coating containing the aliphatic ketone type solvent as the main ingredient has been printed, whereas the remaining portions of the resin sheet material are foamed and raised and, as a result, a foam sheet having an appearance of the pattern embossed on the surface of the sheet is produced. After printing the coating containing the aliphatic ketone type solvent as the main ingredient in the form of a pattern on the selected portions of the surface of the foamable polyvinyl chloride resin sheet material containing the specific amine or amines, a transparent overcoating may be applied over the entire surface of the foamable resin sheet material. Presence of the overcoating prevents volatilization of the aliphatic ketone type solvent which may occur during the foaming step and thereby contributes to production of a clear-cut embossed pattern.

According to the process of the present invention in which the polyvinyl chloride resin sheet containing the specific amine or amines and the blowing agent containing azodicarbonamide as its main ingredient is printed on the surface thereof with the coating containing as its main ingredient the aliphatic ketone type solvent which per se does not participate in the behaviour of the blowing agent and the foamable sheet material subsequently is heated for foaming, the quantity of a gas given off due to decomposition of the blowing agent decreases in the portions on which the coating containing the aliphatic ketone type solvent as the main ingredient is printed by reason of interaction which takes place between the specific amine or amines added to the foamable sheet material and the aliphatic ketone type solvent in the coating which coexist in these printed portions. Consequently, the foaming does not take place at all or takes place only to a very small extent in these printed portions, whereas the quantity of the gas given off due to decomposition of the blowing agent does not decrease in the portions on which the above described coating is not printed owing to the fact that the specific amine or amines are present but no aliphatic ketone type solvent exists in these unprinted portions, so that the polyvinyl chloride resin sheet material is foamed and raised in these unprinted portions in a normal manner whereby a desired embossed pattern is produced in an overall appearance.

The process according to the invention has completely eliminated the disadvantages of the prior art processes for producing foam sheets having an embossed pattern. More specifically, the invention has the following advantageous results over the prior art processes:

1. Since the amines are mixed in the foamable polyvinyl chloride resin composition containing the blowing agent and a common type of coating containing no compound inhibiting or accelerating decomposition of the blowing agent can be used for applying over the surface of the foamable polyvinyl chloride resin sheet material formed of the foamable polyvinyl chloride resin composition containing the amines, the range of types of coatings available for use is widened as compared with the prior art processes. The process according to the invention therefore is very advantageous in the production of foam sheets having an embossed pattern.

2. According to the invention, special additives such as acid anhydrides and amines are not mixed in the coating and, accordingly, deteriorations such as gelling, blushing and extreme increase in viscosity do not occur in the coating during the production process or storing. The process according to the invention therefore is entirely free from the problem that the coating becomes unfit for use or unsuitable for the printing purpose. Moreover, the embossed pattern on the foam sheet produced according to the process of the invention presents a clear-cut boundary between the raised portions and the unraised portions and has an embossing effect which is as distinct as the embossed pattern made by the prior art processes.

3. According to the invention, the degree of embossing can be chosen as desired by varying the concentration or boiling point of the aliphatic ketone type solvent in the coating. Besides, a foam sheet in which the raised portions and unraised portions of the embossed pattern are in perfect register with the printed pattern can be produced by using a suitable combination of the coating containing the aliphatic ketone type solvent as the main ingredient and a coating containing little or no aliphatic ketone type solvent.

4. Since the amine or amines are included in the foamable polyvinyl chloride resin sheet material, heat stability of the polyvinyl chloride resin is improved with resulting widening of the range of processing conditions in the production of a foam sheet having an embossed pattern.

Before describing the invention in further details with reference to examples, compositions to be used for both examples of the invention and comparative examples made for comparison with the invention are listed in the following Tables 1 and 2. Table 1 shows compositions of foamable polyvinyl chloride resin (Composition No. 1 to No. 5) and a composition of polyvinyl chloride resin used for forming of the overcoating (Composition No. 6). Table 2 shows compositions used for formulating coatings to be printed on the foamable resin sheet. It is, however, to be noted that the scope of the invention is not limited to the examples formulated in accordance with the compositions listed in these tables.

TABLE 1

| Ingredients | Composition No. | | | | | |
|---|---|---|---|---|---|---|
|  | 1 | 2 | 3 | 4 | 5 | 6 |
| Paste PVC resin | 100 | 100 | 100 | 100 | 100 | 100 |
| Zinc type stabilizer | 5 | 5 | 5 | 5 | 5 | 5 |
| Epoxidized soya oil | 2 | 2 | 2 | 2 | 2 | 2 |
| Dicotyl phthalate | 50 | 50 | 50 | 50 | 50 | 50 |
| Azodicarbonamide | 2 | 2 | 2 | 2 | 2 | — |
| Isophoronediamine | 1 | — | — | — | — | — |
| Dodecylamine | — | 1 | — | — | — | — |
| Hexamethylenediamine | — | — | 1 | — | — | — |
| P-phenylenediamine | — | — | — | 1 | — | — |

TABLE 2

| Ingredients | Composition No. | | | | | | | |
|---|---|---|---|---|---|---|---|---|
|  | 7 | 8 | 9 | 10 | 11 | 12 | 13 | 14 |
| Vinyl chloride-vinyl acetate copolymer | 13 | 10 | 10 | 10 | 10 | 10 | 10 | 10 |
| Pigment | — | 3 | 3 | 3 | 3 | 3 | 3 | 3 |
| Methyl ethyl ketone | 87 | 87 | 41 | 38 | — | — | — | — |
| Methyl isobutyl ketone | — | — | 46 | 43 | — | — | — | 10 |
| Cyclohexanone | — | — | — | 6 | — | — | — | — |
| Ethyl acetate | — | — | — | — | 87 | — | — | — |
| Tetrahydrofuran | — | — | — | — | — | 87 | — | 11 |
| Trichloroethylene | — | — | — | — | — | — | 87 | 20 |
| Toluene | — | — | — | — | — | — | — | 46 |

EXAMPLE 1

A foamable polyvinyl chloride resin composition of Composition No. 1 was coated on the surface of an asbestos sheet of 0.5 mm in thickness to form a layer of 0.3 mm in thickness and thereafter was gelled by heating it at 180° C. for 1 minute to form a foamable polyvinyl chloride resin sheet material. The coating for printing of composition No. 8 was printed in the form of a pattern on selected portions of the surface of the foamable polyvinyl chloride resin sheet material by means of a gravure roll (100 mesh depth 45μ) and dried at a room temperature for 3 minutes. The polyvinyl chloride resin composition of Composition No. 6 was subsequently applied on the foamable resin sheet material to form an overcoating layer of 0.2 mm in thickness and the foamable polyvinyl chloride resin was caused to foam by heating it at 200° C. for 2 and half minutes. The produced foam sheet had depressed portions on its surface corresponding to the portions where the coating was printed and foamed and raised portions corresponding to the portions where the coating was not printed. The result of measuring the depth of the depressed portions from the top of the raised portions is shown in Table 3.

EXAMPLE 2

A foam sheet having an embossed design was produced under the same conditions as in Example 1 except that the foamable polyvinyl chloride resin composition of Composition No. 2 was used instead of the foamable polyvinyl chloride resin composition of Composition No. 1. The measurement of the same type as in Example 1 was conducted. The result of the measurement is shown in Table 3.

EXAMPLE 3

A foam sheet having an embossed pattern was produced under the same conditions as in Example 1 except that the coating for printing of Composition No. 7 was used instead of the coating for printing of Composition No. 8. The measurement of the same type as in Example 1 was conducted. The result of the measurement is shown in Table 3. The produced foam sheet had no color printed pattern but an embossed pattern only.

EXAMPLE 4

A foam sheet having an embossed pattern was produced under the same condition as in Example 1 except that the coating for printing of Composition No. 9 was used instead of the coating for printing of Composition No. 8. The result of the measurement of the same type as in Example 1 is shown in Table 3.

EXAMPLE 5

A foam sheet having an embossed pattern was produced under the same conditions as in Example 1 except that the coating for printing of Composition No. 10 was used instead of the coating for printing of Composition No. 8. The result of the measurement of the same type as in Example 1 is shown in Table 3.

COMPARATIVE EXAMPLE 1

A foam sheet was produced under the same conditions as in Example 1 except that the foamable polyvinyl chloride resin composition of Composition No. 5 was used instead of the foamable polyvinyl chloride resin composition of Composition No. 1. No embossed pattern was formed on the produced foam sheet.

COMPARATIVE EXAMPLE 2

A foam sheet was produced under the same conditions as in Example 1 except that the foamable polyvinyl chloride resin composition of Composition No. 5 was used instead of the foamable polyvinyl chloride resin composition of No. 1 and that the coating for printing of Composition No. 9 was used instead of the coating for printing of Composition No. 8. No embossed pattern was formed on the produced foam sheet.

COMPARATIVE EXAMPLE 3

A foam sheet was produced under the same conditions as in Example 1 except that the foamable polyvinyl chloride resin composition of Composition No. 5 was used instead of the foamable polyvinyl chloride resin composition of Composition No. 1 and that the coating for printing of Composition No. 10 was used instead of the coating for printing of Composition No. 8. No embossed pattern was formed on the produced foam sheet.

COMPARATIVE EXAMPLE 4

A foam sheet was produced under the same conditions as in Example 1 except that the coating for printing of Composition No. 11 was used instead of the coating for printing of Composition No. 8. No embossed pattern was formed on the produced foam sheet.

COMPARATIVE EXAMPLE 5

A foam sheet was produced under the same condition as in Example 1 except that the coating for printing of Composition No. 12 was used instead of the coating for printing of Composition No. 8. No embossed pattern was formed on the produced foam sheet.

COMPARATIVE EXAMPLE 6

A foam sheet was produced under the same conditions as in Example 1 except that the coating for printing of Composition No. 13 was used instead of the coating for printing of Composition No. 8. No embossed pattern was formed on the produced foam sheet.

COMPARATIVE EXAMPLE 7

A foam sheet was produced under the same conditions as in Example 1 except that the coating for printing of Composition No. 14 was used instead of the coating for printing of Composition No. 8. No embossed pattern was formed on the produced foam sheet.

COMPARATIVE EXAMPLE 8

A foam sheet was produced under the same conditions as in Example 1 except that the foamable polyvinyl chloride resin composition of Composition No. 3 was used instead of the foamable polyvinyl chloride resin composition of Composition No. 1. No embossed pattern was formed on the produced foam sheet.

COMPARATIVE EXAMPLE 9

A foam sheet was produced under the same conditions as in Example 1 except that the foamable polyvinyl chloride resin composition of Composition No. 4 was used instead of the foamable polyvinyl chloride resin composition of Composition No. 1. No embossed pattern was formed on the produced foam sheet.

|  | Composition No. of foamable polyvinyl chloride resin composition | Composition No. of coating for printing | Result of measurement of depth of depressed portions (mm) |
|---|---|---|---|
| Example 1 | 1 | 8 | 0.5 |
| Example 2 | 2 | 8 | 0.4 |
| Example 3 | 1 | 7 | 0.5 |
| Example 4 | 1 | 9 | 0.4 |
| Example 5 | 1 | 10 | 0.5 |
| Comparative example 1 | 5 | 8 | 0* |
| Comparative example 2 | 5 | 9 | 0* |
| Comparative example 3 | 5 | 10 | 0* |
| Comparative example 4 | 1 | 11 | 0* |
| Comparative example 5 | 1 | 12 | 0* |
| Comparative example 6 | 1 | 13 | 0* |
| Comparative example 7 | 1 | 14 | 0* |
| Comparative example 8 | 3 | 8 | 0* |
| Comparative example 9 | 4 | 8 | 0* |

*Uniform foaming was observed in both the printed protions and the unprinted portions.

As will be apparent from Table 3, no embossed pattern is formed on the produced foam sheet despite the employment of the coating for printing containing the aliphatic ketone type solvent as its main ingredient unless the specific amine or amines are included in the foamable polyvinyl chloride resin composition (the Comparative examples 1 to 3), whereas no embossed pattern is formed on the produced foam sheet despite the inclusion of the specific amine or amines in the foamable polyvinyl chloride resin composition unless the coating containing the aliphatic ketone type solvent as its main ingredient is used for printing a pattern (Comparative examples 4 to 7). The foam sheet having a distinct embossed pattern in which the portions applied with the coating for printing form depressed portions and the portions applied with no such coating form raised portions can be produced only in a case where the specific amine or amines are included in the foamable polyvinyl chloride resin composition and the coating containing the aliphatic ketone type solvent as its main ingredient is used for printing a pattern (Examples 1 to 5).

What is claimed is:

1. Process for producing a foam sheet having an embossed pattern comprising a step of printing, in the form of a pattern or design, a coating on selected portions of the surface of a foamable polyvinyl chloride resin sheet material containing a blowing agent which comprises azodicarbonamide as its main ingredient and also containing at least one member of the group consisting of isophoronediamine and dodecyl amine, said coating containing an aliphatic ketone type solvent as its main ingredient and being incapable by itself of substantially inhibiting decomposition of said blowing agent, and a step of subsequently heating the printed foamable polyvinyl resin sheet material to cause portions thereof which have not been printed with said coating to foam to a greater extent than the portions thereof which have been printed with said coating.

2. Process for producing a foam sheet having an embossed pattern as defined in claim 1 wherein said amine or amines are added to the polyvinyl chloride resin sheet material at a ratio of at least 0.1 weight part to 100 weight parts of polyvinyl chloride resin.

3. Process for producing a foam sheet having an embossed pattern as defined in claim 1 wherein the ingredient ratio of the aliphatic ketone type solvent in said coating is at least 50 weight percent.

4. Process for producing a foam sheet having an embossed pattern as defined in claim 1 wherein said aliphatic ketone type solvent is acetone.

5. Process for producing a foam sheet having an embossed pattern as defined in claim 1 wherein said aliphatic ketone type solvent is methyl ethyl ketone.

6. Process for producing a foam sheet having an embossed pattern as defined in claim 1 wherein said aliphatic ketone type solvent is methyl isobutyl ketone.

7. Process for producing a foam sheet having an embossed pattern as defined in claim 1 wherein said polyvinyl chloride resin sheet material containing said blowing agent and said amine or amines is a polyvinyl chloride plastisol and said polyvinyl chloride plastisol is coated over a base and is heated to gell the plastisol prior to the printing of said coating.

8. Process for producing a foam sheet having an embossed pattern as defined in claim 6 wherein a transparent overcoating is applied to the entire surface of said polyvinyl chloride resin sheet material after said coating is printed on the selected portions of said surface of said polyvinyl chloride resin sheet material and before said polyvinyl chloride resin sheet material is heated for foaming thereof.

* * * * *